United States Patent [19]
Fraser et al.

[11] Patent Number: 5,447,374
[45] Date of Patent: Sep. 5, 1995

[54] POSITIONING DEVICE FOR TEMPERATURE SENSOR IN FREEZE DRYING

[75] Inventors: Douglas S. Fraser, Bloomington; Taylor N. Thompson, Kingston, both of N.Y.

[73] Assignee: FTS Systems, Inc., Stone Ridge, N.Y.

[21] Appl. No.: 176,422

[22] Filed: Jan. 3, 1994

[51] Int. Cl.[6] .............. G01K 1/00; G01K 1/08; G01K 7/00; B65D 39/00
[52] U.S. Cl. ................... 374/208; 374/150; 374/166; 215/227; 215/246; 215/361
[58] Field of Search .......... 374/208, 141, 150, 166, 374/179; 73/866.5; 215/365, 227, 246, 361, 364; 136/200, 230, 242; 34/284

[56] References Cited
U.S. PATENT DOCUMENTS

| | | |
|---|---|---|
| 936,467 | 10/1909 | Maurer .................. 374/141 |
| 4,966,469 | 10/1990 | Fraser et al. . |
| 5,004,355 | 4/1991 | Ryan ..................... 374/208 |
| 5,076,108 | 12/1991 | Trimarchi ............... 73/866.5 |

Primary Examiner—William A. Cuchlinski, Jr.
Assistant Examiner—Andrew Hirshfeld
Attorney, Agent, or Firm—Wallenstein & Wagner, Ltd.

[57] ABSTRACT

A method and device (10) for positioning a probe (14), such as a temperature sensor, in a flask (12). A stopper adapted to be secured to an open end of the flask (12) is provided having an opening (32) through which a tube (34) extends. A clamping mechanism (40) is connected to the tube (34) to secure the probe (14) to the stopper. The clamping mechanism (40) comprises a first flange (44), and a second opposing flange (46) spaced slightly apart from the first flange (44). An O-ring (50) positioned around the flanges (44, 46) causes them to flex inward to engage and secure the probe (14) between them.

30 Claims, 2 Drawing Sheets

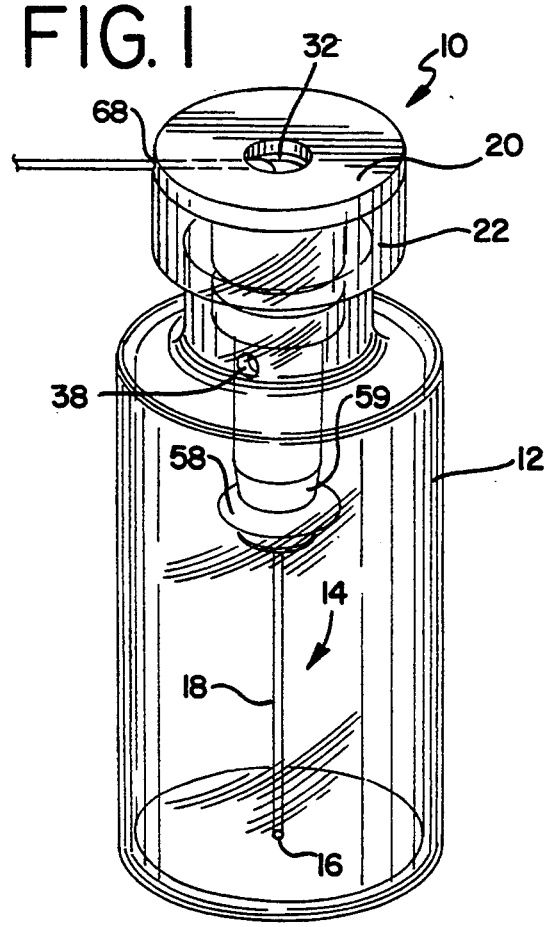
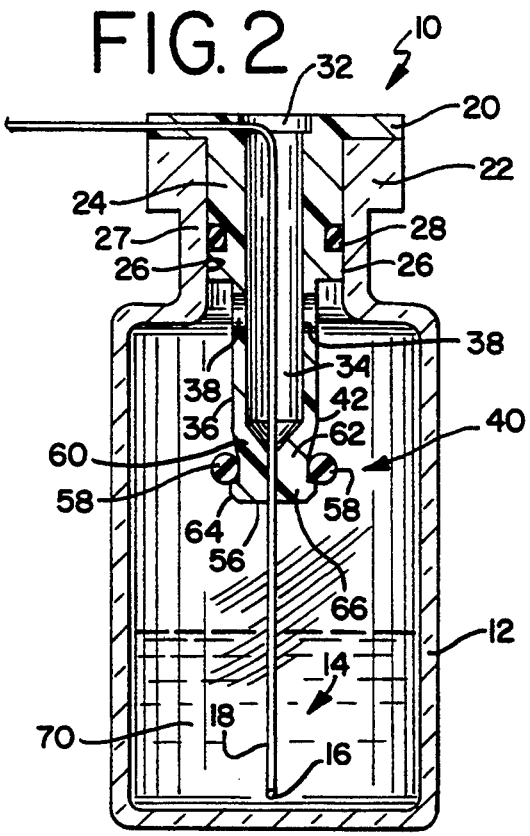
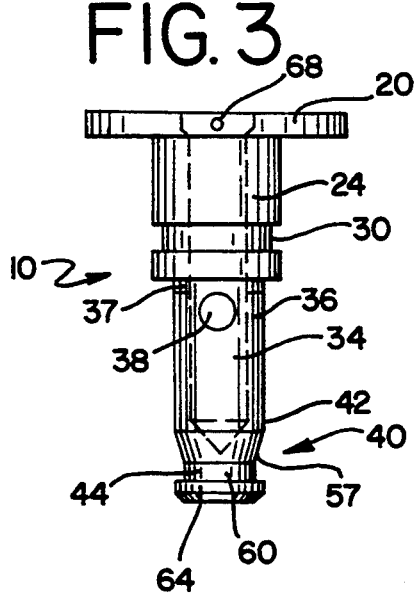
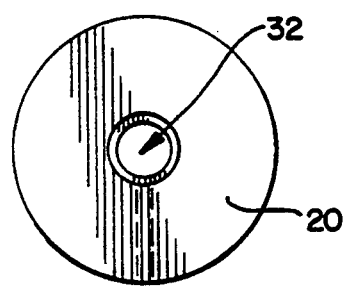
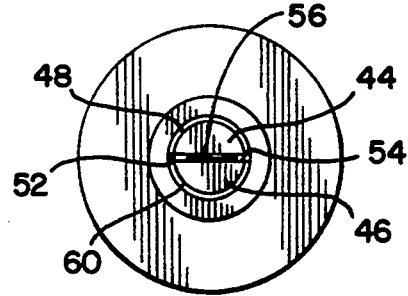

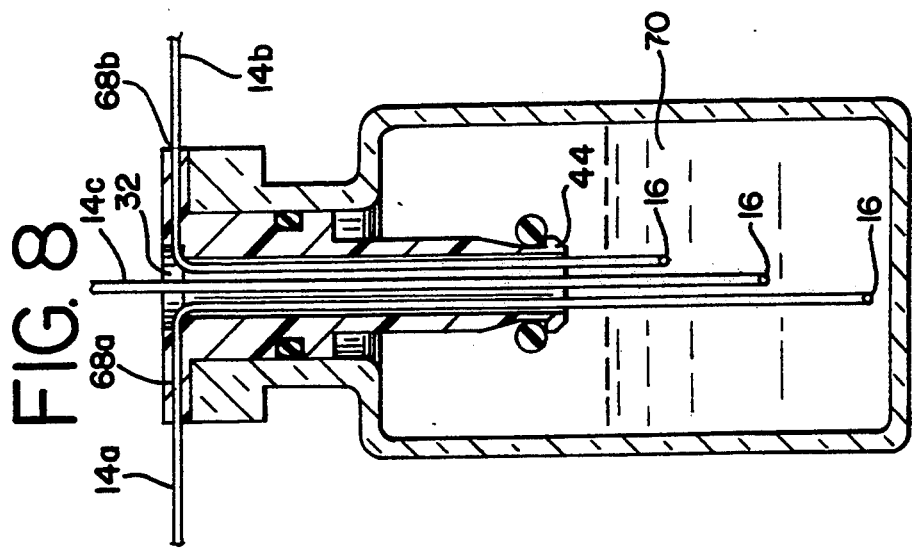
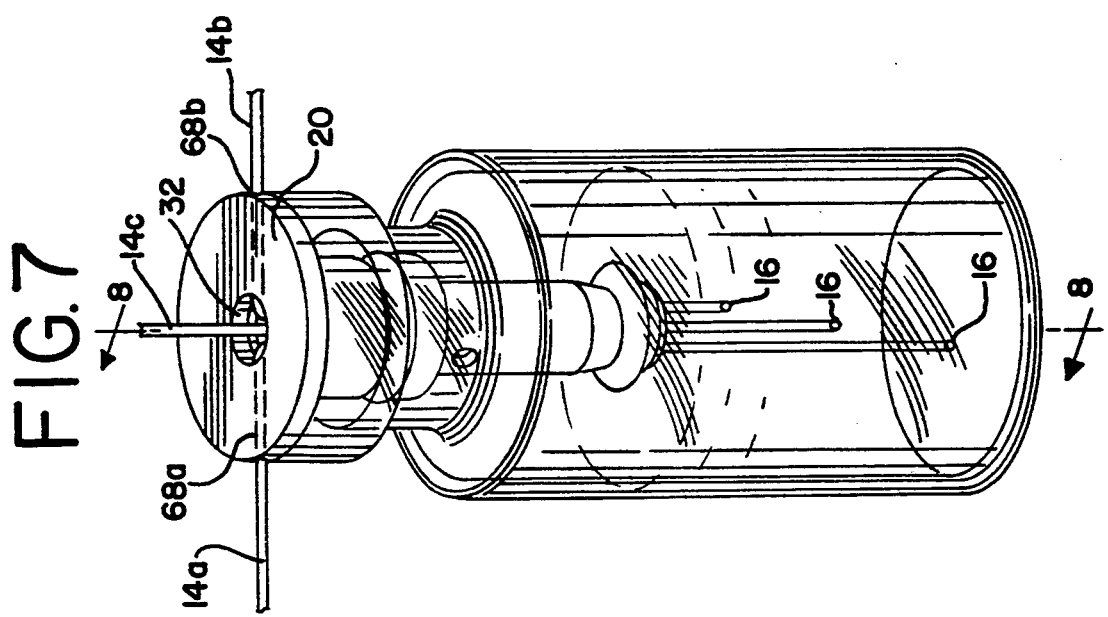
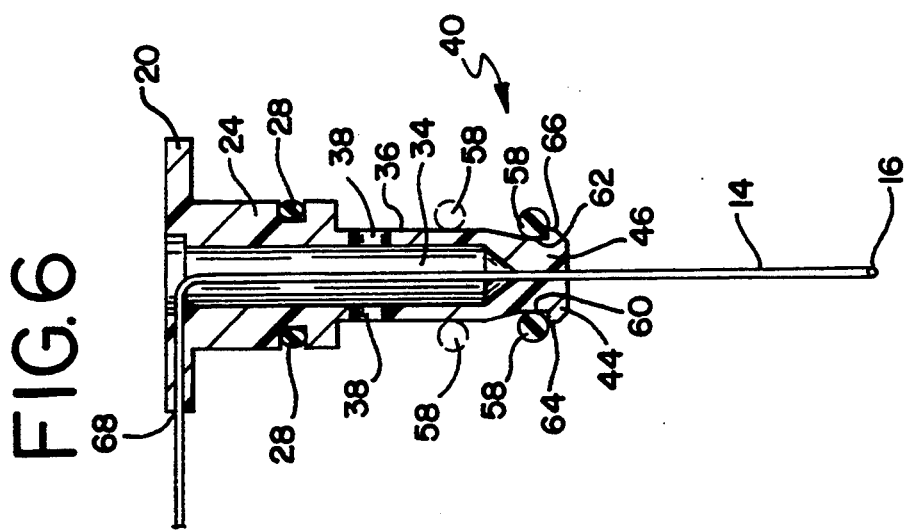

POSITIONING DEVICE FOR TEMPERATURE SENSOR IN FREEZE DRYING

TECHNICAL FIELD

This invention relates generally to a method and device for positioning a probe in a container and, more particularly, to a method and device for positioning a temperature sensor in a freeze drying flask.

BACKGROUND OF THE INVENTION

Freeze drying has been proven useful in many fields, including food processing and laboratory analysis of organic materials. Freeze drying enables the removal through sublimation of solvents, including water, from a substance without destroying its cellular structure. Through sublimation, the substance being freeze dried remains in a frozen, solid form until it is dried, i.e., until all of the liquid is removed from that substance.

Sublimation occurs when the frozen substance is heat treated in a proper manner. If improperly treated, the frozen solvent within the substance melts rather than vaporizes, damaging the substance and often rendering it unusable. Accordingly, the temperature level within a flask typically used for freeze drying is critical to proper sublimation.

In a common freeze-drying operation, one end of a drying flask is secured to a manifold of a conventional freeze-drying apparatus, such as that shown and described in U.S. Pat. No. 4,017,983, issued to Douglas S. Fraser on Apr. 19, 1977, and entitled "Freeze Dryer." In another common operation, the drying flasks are placed in a so-called tray dryer. Typically, the volume of these flasks is between five (5) and one-hundred (100) milliliters.

In tray drying, the temperature of the substance within one drying flask on the tray is monitored by a thermocouple. To ensure proper temperature monitoring, the thermocouple should extend through the length of the substance and its end, the point of highest sensitivity, should be adjacent to but not contacting the bottom center of that flask. The thermocouple will then determine the temperature of the substance in the central lower portion of the flask.

The freeze drying of a substance occurs at the ice interface. It follows, therefore, that a substance contained in a flask will dry from the top downward and from the sides inward, thus leaving the bottom central section the last portion to dry. Since the drying of a substance is accompanied by a rise in temperature, it becomes essential to monitor temperature at this critical point so that one may control the freeze drying process accurately either by manual or automatic means.

Unless the thermocouple is placed at a correct location within that flask, and unless that thermocouple remains fixed at that location, incorrect temperature information can be transmitted to the operator or the electronic controls determining the process parameters. This in turn can lead to improper adjustments of temperature, and damage to or destruction of the substance being freeze dried.

One device for positioning a temperature sensor in a freeze drying flask is shown and described in U.S. Pat. No. 4,966,469 issued to Fraser at al. on Oct. 30, 1990. The device includes a stopper which is snap-fittingly secured to a flask. The stopper has an opening approximately in its center through which an annular tube extends into the flask. A thermocouple is coiled around and supported by the annular tube so that its free end is positioned in the center of the flask. However, such a device is not easily adjustable, making it difficult for use on flasks of various sizes. While it is possible to change the position of the free end of the thermocouple by changing the number of windings around the annular tube, it is a time-consuming process which stresses the thermocouple. Also, it is difficult to use such a device in smaller flasks because most of the thermocouple must be coiled around the annular tube. The present invention provides an easier way to adjust the position of a thermocouple, or similar probe, within any size flask without the need for coiling and uncoiling the thermocouple.

SUMMARY OF THE INVENTION

The present invention is a method and device for positioning a probe, such as a temperature sensing device, in a freeze drying flask. The method comprises providing a stopper which is adapted to be secured to an open end of the flask to hold the probe at a desired position in a sample to be freeze dried. The stopper includes an opening through which a portion of the probe can pass through the stopper. To position the probe in the flask, an end of the probe and a portion of the probe adjacent the end are first inserted through the opening a predetermined distance. Pressure is then applied to a portion of the stopper to secure the probe to the stopper. The end of the probe is then positioned inside the flask and the stopper is secured to the open end of the flask.

The temperature sensor may comprise a thermocouple wire having a thermocouple junction connected to one end thereof. The thermocouple wire has a generally circular cross-section.

The device for positioning the probe, such as the thermocouple described above, comprises a stopper adapted to be secured to an open end of the flask. The stopper includes an opening and a tube extending through the opening. A probe securement portion is connected to the tube. The probe securement portion is adapted to pressurably engage and secure the probe at a predetermined position.

In one embodiment, the probe securement portion may be a clamping mechanism connected to the tube which extends through the opening in the stopper. The clamping mechanism comprises a first flange connected to the tube and a second opposing flange connected to the tube, the first flange being spaced apart from the second flange to form an opening between the flanges through which the probe can be positioned. The flanges should be slightly flexible so that a radially inward pressure applied to the flanges will enable the flanges to engage and secure the probe in place between the flanges. The radially inward pressure can be applied by an elastic band or O-ring positioned around the flanges. Compression of the elastic band will cause the flanges to flex inward toward each other, thus securing the probe therebetween. Removing the radially inward pressure by, for instance, moving the elastic band or O-ring from around the flanges, will unfasten the clamping mechanism and allow for readjustment of the probe. In this manner, the positioning device and probe may then be removed from one flask and be easily repositioned in a second flask having different dimensions.

Additionally, the device may be used to hold a plurality of probes in the flask. These probes may be placed at various locations in order to obtain a range of values. This can be useful, for instance, to measure the gradient of temperatures within a sample to be freeze dried.

BRIEF DESCRIPTION OF THE DRAWINGS

FIG. 1 is a perspective view of the positioning device of the present invention while in place in a freeze drying flask;

FIG. 2 is a cross-sectional view of the positioning device and flask of FIG. 1 as used with a product to be freeze dried;

FIG. 3 is a side elevational view of the positioning device;

FIG. 4 is a top view of the positioning device shown in FIG. 3;

FIG. 5 is a bottom view of the positioning device shown in FIG. 3;

FIG. 6 is a cross-sectional view of the positioning device;

FIG. 7 is a perspective view of an alternative embodiment of the device; and

FIG. 8 is a cross-sectional view of the positioning device of FIG. 7.

DETAILED DESCRIPTION OF THE PREFERRED EMBODIMENT

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 shows the positioning device 10 in a typical environment, that is, a freeze drying flask 12. The positioning device 10 is used to ensure proper placement of a probe, in the form of a temperature sensor 14, at a specific position within the flask. The temperature sensor includes a thermocouple junction 16 connected to an end of a wire element, or thermocouple wire 18. The thermocouple wire 18 is preferably a thirty-six gauge (0.005") type "T" wire with a Teflon ® coating. Additionally, the thermocouple wire 18 can be encased in a steel sheath.

The positioning device 10 is formed into a stopper and has a generally circular horizontal cross-sectional shape. The positioning device 10 is preferably formed out of Noryl ® (a polyphenylene oxide material); however, other similar materials such as plastic or rubber may be used. The positioning device 10 includes an upper disk-shaped portion 20 having a radius greater than the opening of the open end 22 of the flask 12. The upper portion 20 remains on the outside of the flask 12 while the positioning device is being used.

The upper portion 20 is connected to a generally cylindrical mouth-engaging portion 24 which, along with the remainder of the positioning device 10, is inserted into the flask 12. The mouth-engaging portion 24 has a radius which generally corresponds to the radius of the inner walls 26 of the mouth 27 at the open end 22 of the flask 12. The mouth-engaging portion 24 includes a silicon seal 28 positioned in an annular groove 30. The annular groove is more easily seen without the seal in FIG. 3.

The upper portion 20 includes a first opening 32 approximately in the center of the upper portion 20. An annular tube 34 extends from the opening 32. The annular tube 34 is formed from the upper portion 20, the mouth-engaging portion 24 and a generally cylindrical ventilation portion 36 connected at one end 37 to the mouth-engaging portion 24. The ventilation portion 36 includes vent holes 38 which allow for fluid communication between the inside of the flask 12 and the outside of the flask through the annular tube 34 and opening 32. Such fluid communication is necessary for the freeze drying process as explained below.

A clamping mechanism or portion 40 is connected to a lower end 42 of the ventilation portion 36 which is used to engage and hold the thermocouple wire securely in a predetermined position. The clamping mechanism includes a first flange 44 and a second flange 46. As shown in a bottom view of the device in FIG. 5, each flange 44,46 has a semi-circular cross-sectional shape having an arcuate portion 48,50 and a flat portion 52,54, respectively. The flanges 44,46 are positioned with their flat portions 52,54 facing each other so that the arcuate portions 48,50 form a generally cylindrical shape. The flanges are spaced apart a slight distance to form a slit 56 therebetween. The slit 56 is sized to allow the thermocouple junction 16 and wire 18 to pass between the flanges 44,46. The flanges 44,46 should be slightly flexible so that a radially inward force will cause the flanges 44,46 to move toward each other and clamp the thermocouple wire 18 between them.

An elastic silicon O-ring 58 is used to apply the radially inward force. The O-ring 58 can be positioned in an annular groove 60,62 formed along the outer portions of the first and second flanges 44,46. A lip 64,66 is provided on each flange 44,46 to prevent the O-ring from slipping off the device when in use. The annular groove and lip can be more easily seen in FIG. 3 without the O-ring 58 in place.

In order to secure the temperature sensor 14 at a desired position, the O-ring 58 is first moved axially upward onto the ventilation portion 36, as shown in phantom in FIG. 6, to remove any radially inward forces on the flanges 44,46.

A smoothly sloping frustoconical section 59 which connects the clamping portion 40 to the lower end 42 of the ventilation portion 36 is included to accommodate the axially upward movement of the O-ring 58. The thermocouple junction 16 and a portion of the thermocouple wire 18 are inserted through a second opening or port 68 which is on the side of the upper portion 20 of the positioning device 10. The port 68 provides access to the annular tube 34. Alternatively, the thermocouple wire 18 and junction 16 may be inserted directly through the front opening 32 into the annular tube 34. The thermocouple junction 16 and wire 18 are moved through the annular tube 34 and the slit 56 formed between the flanges 44,46 until the thermocouple junction 16 is at the desired predetermined distance from the positioning device 10. The O-ring 58 is then moved axially downward into the annular groove 60,62 to provide a radially inward force. This causes the flanges 44,46 to flex inward toward each other to clamp the thermocouple wire 18 securely between them. The thermocouple junction 16 can then be inserted into the flask 12 and the positioning device secured to the open end 22 of the flask 12. The end of the thermocouple wire 18 opposing the thermocouple junction 16 is typically connected to an electronic device (not shown) for monitoring the temperature inside the flask 12. The thermocouple junction 16 is preferably positioned slightly above the bottom of the flask 12.

To readjust the position of the thermocouple junction 16, the positioning device 10 and thermocouple junction 16 are first removed from the flask 12. The O-ring 58 is moved axially upward onto the ventilation portion 36 to remove the radially inward clamping forces on the flanges 44,46. The thermocouple wire 18 can then be moved axially upward or downward to the desired position. The O-ring 56 is then moved axially downward to again clamp the thermocouple wire 18 between the flanges 44,46.

In this embodiment, freeze drying is effected by placing the flask 12 with the temperature sensor 14 secured therein with the positioning device 10 in a tray dryer. The flask 12 will be the monitored sample, while other samples will simply contain conventional split stoppers which are unseated until after the drying process is complete. As may be seen in FIG. 2, in the embodiment described above, a material 70 to be freeze-dried has been "stub" frozen in a plug-like structure at the bottom of the flask 12. As drying within the tray dryer begins, vapors from sublimation move through the vent holes 38 and out of the flask 12 through the annular tube 34 and first opening 32. The vent holes 38, annular tube 34, and first opening 32 can be calibrated to approximate the vapor path of a standard split stopper, allowing the monitored sample to parallel the drying characteristics of the samples that are not monitored. The temperature of the frozen material 70 is sensed by the thermocouple junction 16 positioned in the flask 12. That temperature is important in determining the sequence and timing of operations to be performed during the freeze drying process. This allows monitoring of one sample on a tray which, in turn, reveals the condition of the other samples in the tray. In this way, the freeze drying process of all samples may be controlled with closure to be accomplished when the monitored sample indicates that drying is complete.

In an alternative embodiment, a plurality of temperature sensors may be used to measure the gradient of temperatures at various elevations in the sample. As shown in FIGS. 7 and 8, three temperature sensors 14a, 14b,14c are maintained at different elevations by the positioning device 10. To accommodate the temperature sensors 14a,14b,14c, two ports 68a,68b are provided on the side of the upper portion 20 of the device 10. The ports 68a,68b, provide access for two of the temperature sensors 14a,14b, respectively. The third temperature sensor 14c is inserted through the first opening 32 to illustrate that it is possible to directly insert a temperature sensor through this opening 32. Alternatively, a third port in the side of the upper portion 20 may be provided for the third temperature sensor 14c.

In the embodiment shown in FIG. 7, the ports 68a,68b are spaced at least 180° from each other. However, closer spacing may be used, especially if more than two ports are desired.

The ports 68a,68b provide access to the annular tube 34 for the temperature sensors 14a,14b.

Each temperature sensor 14a,14b,14c is moved through the annular tube 34 and the slit 56 formed between the flanges 44,46 until the thermocouple junctions 16 at the ends of the sensors are positioned at the desired locations. In the arrangement shown in FIG. 8, the temperature could be sensed at the bottom, middle and top of the sample. Alternatively, one or more of the thermocouple wires 18 may be bent after insertion through the device 10, to measure the temperature near the outer edge or at any desired position in the sample.

After the temperature sensors 14a,14b,14c are at the desired position, the O-ring 58 is positioned to clamp the sensors. FIG. 8 shows the temperature sensors 14a,14b,14c aligned against one flange 44 of the clamping portion.

While specific embodiments have been illustrated and described, numerous modifications come to mind without markedly departing from the spirit of the invention. The scope of protection is thus only intended to be limited by the scope of the accompanying claims.

We claim:

1. A method of positioning a probe inside a flask to monitor the temperature of a product inside said flask during a freeze drying operation comprising:

providing a stopper adapted to be secured to an open end of said flask, said stopper including an upper portion having an opening, and a tube extending from said opening, said upper portion further including a port on a side of said upper portion disposed below an upper surface of said upper portion which extends to and provides access to the interior of said tube and through which a portion of said probe can pass through said stopper, said tube including ventilation holes to allow for fluid communication between the inside of said flask and the outside of said flask;

inserting an end of said probe and said portion of said probe through said port a predetermined distance, wherein said probe extends outward from said tube;

applying pressure to a portion of said stopper to secure said probe to said stopper;

positioning said end of said probe inside said flask; and securing said stopper to said open end of said flask.

2. The method of claim 1, wherein said inserting step comprises pushing said probe, in the form of a thermocouple having a thermocouple junction attached to an end of a wire element, through said port.

3. The method of claim 1, wherein said pressure applying step comprises providing said stopper with a clamping mechanism to secure said probe, said clamping mechanism including a first flange and a second flange opposing and spaced apart from said first flange.

4. The method of claim 3 further comprising positioning an elastic band around said first and second flanges to apply a radially inward force to enable said flanges to engage and secure said probe when positioned between said flanges.

5. The method of claim 3, further comprising positioning an O-ring around said first and second flanges to apply a radially inward force to enable said flanges to engage and secure said probe when positioned between said flanges.

6. A device for positioning a probe in a flask comprising:

a stopper adapted to be secured to an open end of said flask, said stopper including an upper portion having an opening and a tube extending through said opening, said tube having ventilation holes to provide fluid communication between the inside of said flask and the outside of said flask through said tube and said opening;

a port on a side of said upper portion disposed below an upper surface of said upper portion, said port extending to said tube to provide access to the interior of said tube for said probe; and a probe securement portion connected to said tube, said probe securement portion adapted to pressurably engage and secure said probe at a predetermined position.

7. The device of claim 6, wherein said probe securement portion comprises a first flange connected to said tube and a second opposing flange connected to said tube, said first flange being spaced apart from said second flange to form an opening between said flanges through which said probe can be positioned.

8. The device of claim 7 including means for applying a radially inward pressure to said flanges to enable said flanges to engage and secure said probe in place between said flanges.

9. The device of claim 8, wherein said pressure applying means comprises an elastic band positioned about an outer periphery of said flanges.

10. The device of claim 9, wherein said elastic band comprises an O-ring.

11. The device of claim 6, wherein said probe includes a thermocouple junction connected to a wire element.

12. The device of claim 6, wherein said stopper further comprises a plurality of said ports which allow access to the interior of said tube for a plurality of said probes.

13. The device of claim 12, wherein said stopper is adapted to pressurably engage and secure said plurality of probes at a corresponding plurality of predetermined positions.

14. A device for positioning a thermocouple junction attached to a wire element at a predetermined position inside a flask comprising:

a stopper adapted to be snap-fittingly secured to an open end of said flask, said stopper including an upper portion which remains outside of said flask when said stopper is secured to said open end of said flask, said upper portion having an opening approximately in the center of said upper portion;

an annular tube integrally connected at one end to said upper portion of said stopper and extending through said opening in said upper portion, said tube including a ventilation hole to provide fluid communication between the inside of said flask and the outside of said flask through said tube and said opening;

a port on a side of said upper portion disposed below an upper surface of said upper portion, said port extending to said tube to provide access to the interior of said tube for said wire element; and a clamping mechanism integrally connected to an end of said tube opposing said end connected to said upper portion, said clamping mechanism adapted to engage and pressurably secure said wire element attached to said thermocouple junction.

15. The device of claim 14, wherein said clamping mechanism comprises a first flange and a second flange opposing and spaced apart from said first flange, said flanges including an inner recessed portion along an outer portion of said flanges to define a generally annular groove.

16. The device of claim 15, wherein an elastic band is positioned around said first and second flanges in said annular groove to apply a radially inward force to enable said flanges to engage and secure said wire element when positioned between said flanges.

17. The device of claim 16, wherein axially upward movement of said elastic band releases said clamping mechanism to allow for readjustment of said wire element and thermocouple junction.

18. The device of claim 14, wherein said upper portion includes a plurality of said ports which allow access to the interior of said tube for a plurality of said wire elements.

19. The device of claim 14, wherein said stopper is adapted to engage and pressurably secure a plurality of said wire elements.

20. A method of positioning a probe inside a flask comprising:

providing a stopper adapted to be secured to an open end of said flask, said stopper including an opening through which a portion of said probe can pass through said stopper, said stopper further including a clamping mechanism to secure said probe, said clamping mechanism including a first flange and a second flange opposing and spaced apart from said first flange;

inserting an end of said probe and said portion of said probe through said opening a predetermined distance;

positioning an elastic band around said first and second flanges to apply a radially inward force to enable said flanges to engage and secure said probe when positioned between said flanges;

positioning said end of said probe inside said flask; and securing said stopper to said open end of said flask.

21. A method of positioning a probe inside a flask comprising:

providing a stopper adapted to be secured to an open end of said flask, said stopper including an opening through which a portion of said probe can pass through said stopper, said stopper further including a clamping mechanism to secure said probe, said clamping mechanism including a first flange and a second flange opposing and spaced apart from said first flange;

inserting an end of said probe and said portion of said probe through said opening a predetermined distance;

positioning an O-ring around said first and second flanges to apply a radially inward force to enable said flanges to engage and secure said probe when positioned between said flanges;

positioning said end of said probe inside said flask; and securing said stopper to said open end of said flask.

22. A device for positioning a probe in a flask comprising:

a stopper adapted to be secured to an open end of said flask, said stopper including an opening and a tube extending through said opening;

a probe securement portion connected to said tube, said probe securement portion including a first flange connected to said tube and a second opposing flange connected to said tube, said first flange being spaced apart from said second flange to form an opening between said flanges through which said probe can be positioned; and an elastic band positioned about an outer periphery of said flanges for applying a radially inward pressure to said flanges to enable said flanges to engage and secure said probe in place between said flanges.

23. The device of claim 22, wherein said elastic band comprises an O-ring.

24. A device for positioning a thermocouple junction attached to a wire element at a predetermined position inside a flask comprising:

a stopper adapted to be snap-fittingly secured to an open end of said flask, said stopper including an upper portion which remains outside of said flask when said stopper is secured to said open end of said flask, said upper portion having an opening approximately in the center of said upper portion;

an annular tube integrally connected at one end to said upper portion of said stopper and extending through said opening in said upper portion;

a clamping mechanism integrally connected to an end of said tube opposing said end connected to said upper portion, said clamping mechanism including a first flange and a second flange opposing and spaced apart from said first flange, said flanges including an inner recessed portion along an outer portion of said flanges to define a generally annular groove, and an elastic band positioned around said first and second flanges in said annular groove to apply a radially inward force to enable said flanges to engage and secure said wire element when positioned between said flanges.

25. The device of claim 24, wherein axially upward movement of said elastic band releases said clamping mechanism to allow for readjustment of said wire element and thermocouple junction.

26. The device of claim 24, wherein said upper portion includes a port which allows access to the interior of said tube for said wire element.

27. The device of claim 26, wherein said upper portion includes a plurality of said ports which allow access to the interior of said tube for a plurality of said wire elements.

28. The device of claim 24, wherein said stopper is adapted to engage and pressurably secure a plurality of said wire elements.

29. A device for positioning a probe in a flask comprising:

a stopper adapted to be secured to an open end of said flask, said stopper including an upper portion having a centrally located opening and a tube extending through said opening;

a port on a side of said upper portion disposed below an upper surface of said upper portion, said port extending to said tube to provide access to the interior of said tube for said probe; and a probe securement portion connected to said tube, said probe securement portion including a first flange and a second flange spaced apart from said first flange to form a slit through which said probe can be positioned.

30. The device of claim 29, wherein said tube further comprises a mouth engaging portion to engage said open end of said flask, said mouth engaging portion including a seal positioned in an outer annular groove.

* * * * *